(12) United States Patent
Weston et al.

(10) Patent No.: US 10,846,963 B2
(45) Date of Patent: Nov. 24, 2020

(54) METHOD AND SYSTEMS FOR EVENT ENTRY WITH FACIAL RECOGNITION

(71) Applicant: HOSPITALITY ENGAGEMENT CORPORATION, Cleveland, OH (US)

(72) Inventors: John P. Weston, Rocky River, OH (US); Brian Stein, Solon, OH (US); David Garrett, Cleveland, OH (US); Jason Scalese, Cleveland, OH (US); Evan Cooper, Chagrin Falls, OH (US); Robert Allen Walker, North Olmsted, OH (US); Austin Brian Nelson, Nekoosa, WI (US); Lonnie Hanlon, Akron, OH (US); Anthony Pyros, Cleveland, OH (US)

(73) Assignee: Hospitality Engagement Corporation, Cleveland, OH (US)

(*) Notice: Subject to any disclaimer, the term of this patent is extended or adjusted under 35 U.S.C. 154(b) by 67 days.

(21) Appl. No.: 15/997,312

(22) Filed: Jun. 4, 2018

(65) Prior Publication Data
US 2018/0350171 A1 Dec. 6, 2018

Related U.S. Application Data

(60) Provisional application No. 62/514,453, filed on Jun. 2, 2017.

(51) Int. Cl.
*G06K 9/00* (2006.01)
*G07C 9/25* (2020.01)
(Continued)

(52) U.S. Cl.
CPC ........... *G07C 9/253* (2020.01); *G06F 16/532* (2019.01); *G06K 9/00288* (2013.01);
(Continued)

(58) Field of Classification Search
CPC .. G06Q 10/02; G06Q 50/265; G06Q 2240/00; G06K 9/00771; G06K 9/00295
(Continued)

(56) References Cited

U.S. PATENT DOCUMENTS 8,964,298 B2 * 2/2015 Haddick ................. G06F 3/013
359/630
2007/0110286 A1 5/2007 Sato et al.
(Continued)

FOREIGN PATENT DOCUMENTS

JP 2002189865 7/2002

OTHER PUBLICATIONS

International Search Report dated Sep. 28, 2018; PCT/US2018/035864; 4 pgs.

*Primary Examiner* — Charlotte M Baker
(74) *Attorney, Agent, or Firm* — Amin, Turocy & Watson, LLP

(57) ABSTRACT

A system is provided that includes an event site device having a display and an imaging device. The event site device is configured to capture an image of a user's face for identification. The system further includes a server configured to associate ticketing information with an identity of the user, receive the image of the user's face from the event site device, determine the identity of the user based on facial feature information stored for the user, retrieve the ticketing information associated with the user, and transmit the ticketing information to the event site device for presentation on the display.

20 Claims, 13 Drawing Sheets

(51) Int. Cl.
*G06Q 10/02* (2012.01)
*G06F 16/532* (2019.01)
*G07C 9/37* (2020.01)
*G07B 15/00* (2011.01)

(52) U.S. Cl.
CPC .............. *G06Q 10/02* (2013.01); *G07C 9/37* (2020.01); *G07B 15/00* (2013.01); *G07C 2209/04* (2013.01)

(58) Field of Classification Search
USPC ............ 382/118; 705/14.17, 39, 5, 26.2, 44; 370/230, 338, 349, 412; 707/706, 783, 707/803, E17.005, E17.014, E17.044; 715/764; 359/630
See application file for complete search history.

(56) References Cited

U.S. PATENT DOCUMENTS

| | | | |
|---|---|---|---|
| 2012/0198371 A1* | 8/2012 | Liwerant | ................ G06Q 50/10 715/764 |
| 2014/0192085 A1 | 7/2014 | Kim | |
| 2015/0294394 A1 | 10/2015 | Shreve et al. | |
| 2016/0042333 A1 | 2/2016 | Ho et al. | |

* cited by examiner

METHOD AND SYSTEMS FOR EVENT ENTRY WITH FACIAL RECOGNITION

CROSS-REFERENCE TO RELATED APPLICATIONS

This application claims the benefit of U.S. Provisional Application Ser. No. 62/514,453, filed Jun. 2, 2017 and entitled METHOD AND SYSTEMS FOR EVENT ENTRY WITH FACIAL RECOGNITION. The entirety of the aforementioned application is incorporated herein by reference.

TECHNICAL FIELD

Embodiments of the subject matter disclosed herein relate to a facial recognition ticketing system for associating a user's face with a digital ticket and allowing event entry based on facial recognition of the user.

DISCUSSION OF ART

Tickets are often used for entry into events. Ticketing is currently available in different forms such as paper ticketing, or digital tickets that are associated with a person's driver's license, credit card, or mobile device.

It may be desirable to have a system and method that differs from those systems and methods that are currently available for ticketing and event admission.

BRIEF DESCRIPTION

In an embodiment, a system is provided that includes an event site device having an imaging device. The event site device is configured to capture an image of a user for identification. The system also includes a server configured to store a global identifier corresponding to the user. The global identifier includes facial image information and a personal identifier of the user, wherein the facial image information is associated with the personal identifier. The server is further configured to associate ticketing information with the user's global identifier, receive the image of the user from the event site device, identify the user's global identifier based on a correlation of the image of the user with the user's facial image information, retrieve the ticketing information associated with the global identifier, and transmit the ticketing information to at least one of the event site device or an event access device.

In certain embodiments, the personal identifier of the user is at least one of an e-mail address or a phone number.

In certain embodiments, the server is further configured to store a plurality of global identifiers belonging to a plurality of users, and store the user's global identifier as part of a person group, wherein the person group contains a subset of the plurality of global identifiers.

In certain embodiments, the server is configured to identify the user's global identifier from the subset of the plurality of global identifiers contained in the person group.

In certain embodiments, the subset of the plurality of global identifiers contained in the person group corresponds to users who purchased a ticket for an event.

In certain embodiments, the event site device comprises a display component.

In certain embodiments, the display component is configured to display the ticketing information.

In certain embodiments, the display component is further configured to display the ticketing information as visually corresponding with the user.

In certain embodiments, the event site device is an augmented reality device.

In certain embodiments, the server includes a point of sale component configured to transmit payment information corresponding to the user to an event venue's point of sale system based on identifying the user using the event site device or a second event site device.

In certain embodiments, the server is configured to transmit the ticketing information to the event access device, and the event access device is configured to allow the user to enter an event venue based on verification of the ticketing information.

In an embodiment, a method includes receiving a user's facial image information and a personal identifier of the user from a user device. The method further includes creating a global identifier by associating the user's facial image information with the personal identifier, and associating ticketing information with the global identifier. The method further includes receiving an image of the user from an event site device, and identifying the global identifier based on a correlation of the image of the user with the user's facial image information. The method further includes retrieving the ticket information associated with the global identifier, and transmitting the ticketing information to at least one of the event site device or an event access device.

In certain embodiments, the personal identifier of the user is at least one of an e-mail address or a phone number.

In certain embodiments, the method further includes storing a plurality of global identifiers belonging to a plurality of users, and storing the user's global identifier as part of a person group and the person group contains a subset of the plurality of global identifiers.

In certain embodiments, the user's global identifier is identified from the subset of the plurality of global identifiers contained in the person group.

In certain embodiments, the subset of the plurality of global identifiers contained in the person group corresponds to users who purchased a ticket for an event.

In certain embodiments, the method further includes transmitting user information to the event site device, and the user information includes at least one of a food preference, a drink preference, a name, an age, a VIP status, the user's payment information, or a seating preference.

In certain embodiments, the method further includes detecting the user's face with the event site device or a second event site device as the user is making an in-event purchase, and transmitting the user's payment information to an event venue's point of sale system based on detecting the user's face while the user is making an in-event purchase.

In certain embodiments, the ticketing information is transmitted to the event access device, and the event access device allows the user to enter an event venue based on verification of the ticketing information.

In an embodiment, a system is provided that includes an event site apparatus having a display and an imaging device. The event site apparatus is configured to capture an image of a user's face for identification. The system further includes a server configured to associate ticketing information with an identity of the user, receive the image of the user's face from the event site apparatus, determine the identity of the user based on facial feature information stored for the user, retrieve the ticketing information associated with the user, and transmit the ticketing information to the event site apparatus for presentation on the display.

BRIEF DESCRIPTION OF THE DRAWINGS

Reference is made to the accompanying drawings in which particular embodiments and further benefits of the subject innovation are illustrated as described in more detail in the description below, in which.

Figure 1:
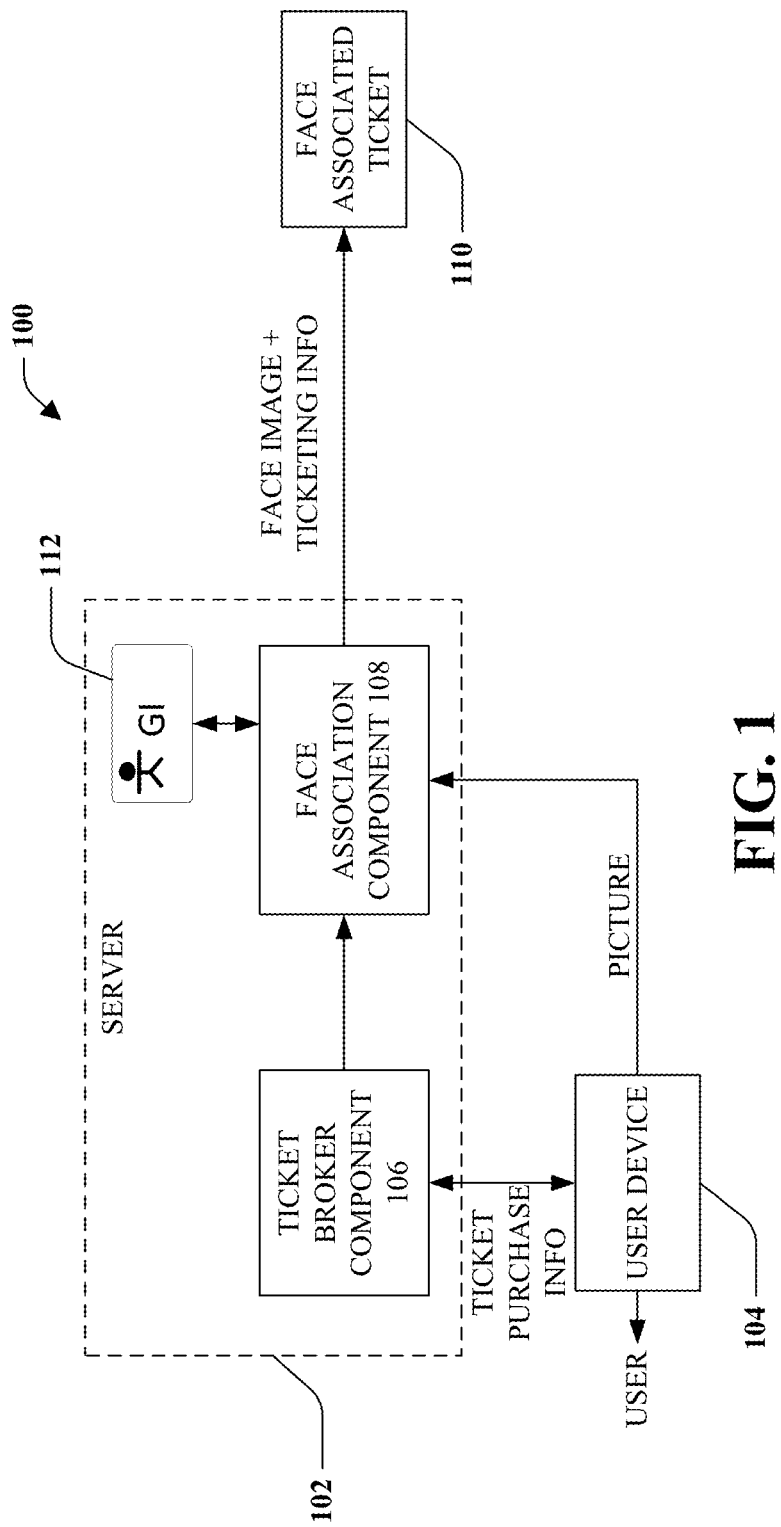
FIG. 1 is a block diagram of a ticket request portion of a facial recognition ticketing system.

APPENDIX A is a document that describes aspects of the claimed subject matter, and this Appendix forms part of this specification.

DETAILED DESCRIPTION OF THE INVENTION

Embodiments of the innovation relate to methods and systems for a facial recognition ticketing application. This system allows a user to request and receive tickets for an event. The tickets can be associated with or digitally linked to an image of the user's face. Upon arrival at the event, the user can be provided entry to the event based on a facial recognition device authenticating the user's identity. Once the user is identified, the tickets associated with the user can be accessed and the user is allowed entry to the event. It should be appreciated that the facial recognition ticketing application can include subsystems such as a ticket request system and an event entry system. With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute.

The term "event" as used herein can be defined as any planned occasion. The event may be either public or private. In another embodiment, the event can be an event that takes place in a virtual reality or augmented reality environment.

FIG. 1 is an illustration of a ticket request system 100 that facilitates ordering ticket(s) and associating the ticket information with an image of a user's face to create a face-associated ticket 110. The ticket request system 100 can include a server 102 and a user device 104. The server 102 can include a ticket broker component 106 and a face association component 108. It should be appreciated that the server 102 can be local, remote, or cloud-based. The server 102 can also be distributed among multiple locations and/or devices.

A user can interact with a user device 104 to correlate, link, and/or assign their face with a unique identifier or a personal identifier. The personal identifier can be, but is not limited to, an e-mail address, a phone number, a credit card, a number on an identification card, a number or barcode on a credit card or identification card, a driver's license, a social security number, a physical address, a portion of biometric data (e.g., fingerprint, a retinal scan, a voice recognition, an inductance, among others), a personal identification number (PIN), an answer to a security question, among others. It should be appreciated that the use of an e-mail address or a phone number can provide a greater level of user privacy than other identifiers and reduces the risk of identity theft. The user can input an electronic image of the user's face or the user can use the user device 104 to take a new electronic image of the user's face. The face association component 108 can analyze the electronic image to determine if the electronic image is acceptable to function as identification of the user. If the electronic image is unacceptable for a reason, the system 100 can request the user to take or provide a new electronic image due to lack of meeting one or more standards. In an embodiment, the system 100 can request the user to take or provide a new electronic image due to, but not limited to, the following standards: a pre-defined quality threshold, a lighting issue, a resolution threshold, a characteristic of a digital photo (e.g., hue, saturation, contrast, etc.), obstructions of the user's face, file size, among others. Once an acceptable electronic image of the user's face is received based on meeting the one or more standards, the facial electronic image is correlated with the personal identifier and stored on the server 102 as a global identifier 112. For example, the facial electronic image can be digitally linked to the personal identifier. In a particular embodiment, a portion of data related to the facial electronic image can be digitally linked to a portion of data related to the personal identifier to allow referencing or queried and identified. In certain embodiments, the user can purchase a ticket using the ticket broker component 106 and correlate the ticket with the user's global identifier 112 (also referred to as "GI 112"). In some embodiments, the GI 112 can be stored on the server 102 as part of the face association component 108, or the GI 112 can be stored on another location in the server that is accessible by the face association component 108.

In an embodiment, a user can access an application on the user device 104 to begin a ticket request process. The user can select one or more ticket to purchase for an event utilizing or accessing the ticket broker component 106. The ticket broker component 106 can be incorporated into the server 102, a remote component that is stand-alone, or can be integrated into the ticket request system 100. The ticket broker component 106 can be configured to display a ticket marketplace to allow the user to purchase tickets from a ticket distributor, a third party ticket reseller, or another user. When purchasing a ticket from a third party ticket reseller or another user, the ticket may be transferred by the ticket transfer component 1002 as further described below with reference to FIG. 10. Ticket broker component 106 can also receive and process the user's payment information. In certain embodiments, ticket broker component 106 can store a user's payment information. While interacting with the ticket broker component 106, the user can select whether to receive electronic (e.g., soft copy) tickets, hard copy (e.g., paper or printed) tickets, or a facial recognition ticket. If the user selects to receive facial recognition tickets, the ticket broker component 106 can communicate the ticketing information for the tickets that the user purchased or selected to the face association component 108.

The user can select to associate the ticketing information with the user's GI 112 if one has already been created for the user. A user's GI 112 associated with (e.g. digitally linked) ticketing information functions as the user's face-associated ticket 110. If no GI 112 exists for the user, the user device can prompt the user whether to use an electronic image already uploaded to the user's account or to take a new "selfie" (or image of the user's face). If the user selects to use an electronic image already uploaded to the user's account, the face association component 108 can analyze the electronic image to determine if the existing electronic image meets one or more standards. When the face association component 108 receives an acceptable electronic image from either the user's existing account or from the user device 104, the face association component 108 can associate the user's face with the requested tickets to create face-associated tickets 110 for the user. It should be appreciated that a user can update his or her electronic image at any time. For example, if the user changes his or her facial appearance, the user can update the user's electronic image that is associated with the user's face-associated tickets 110 and/or GI 112.

The system 100 can evaluate and detect if a user's face matches or is similar to another user. For instance, if a user is an identical twin or looks similar to a relative, the face association component 108 can compare and detect such twin or relative situation by comparing a received electronic image of a user and evaluating with a database of already received electronic images for other users. The face association component 108 can leverage a threshold amount of similarity or difference in which correlation can be approved or disapproved between an electronic image and the GI 112. If the similarity is within a predefined threshold, the face association component 108 can communicate a query to the user to ascertain whether the user is a twin or if such similar electronic image is a relative and/or triplet, etc. Upon user input, such data can be associated with the GI 112 for such user and the similar user and/or relative. In the case where a user is an identical twin, triplet, etc., during the face registration process, if the user's uploaded facial electronic image is identical or a very close match to a different user's facial electronic image stored on the server 102, the user is provided with a query asking if the user is an identical twin, a triplet, etc. If the user indicates that the user is an identical twin, triplet, etc., this indication will be included in the user's GI 112. In certain embodiments, a separate database will include identical twins, triplets, etc. These measures can exist so that an additional check or secondary identification may be performed on any detected user that has an identical twin, triplet, etc.

It is to be appreciated that the user device 104 can be any device or combination of devices capable of communicating electronically and/or interfacing with the server 102 and taking a photo of the user. By way of example and not limitation, the user device can be any combination of a computer, a user terminal, a computing device that can access the Internet, a virtual reality device, an augmented reality device, a personal computer, or any mobile device such as a smartphone, a smart watch, a laptop, game console, portable gaming device, or a tablet.

Figure 2:
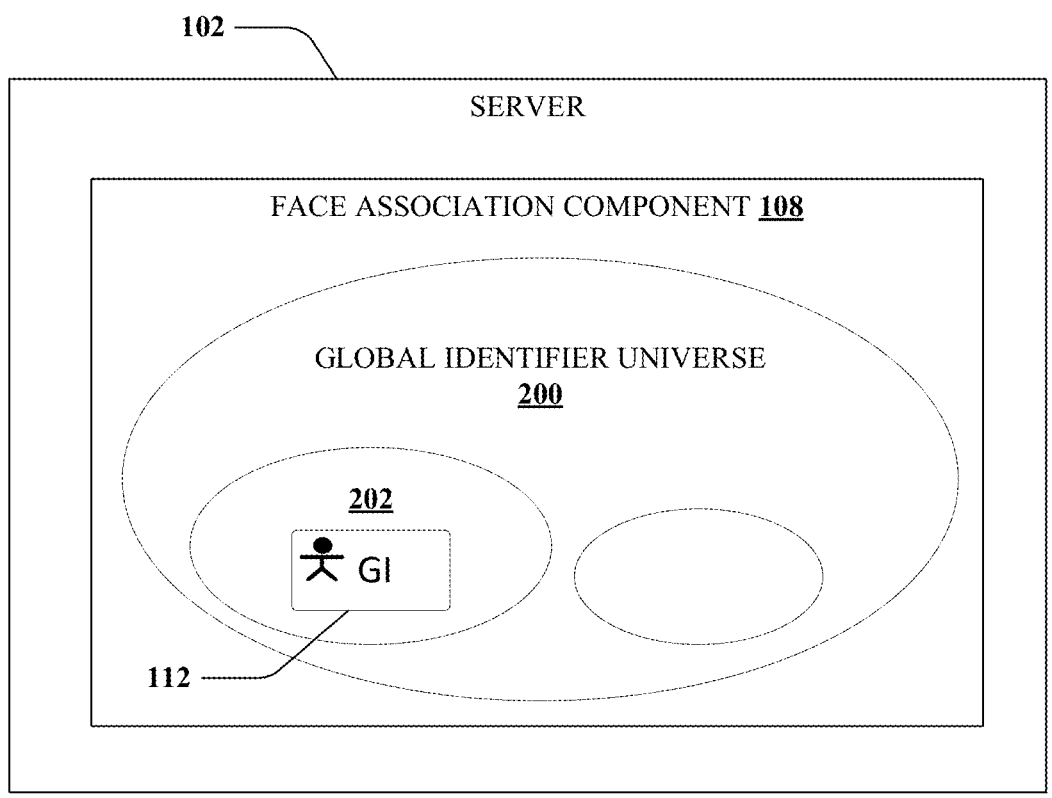
FIG. 2 is a block diagram of a global identifier on a server used as part of the facial recognition ticketing system.

Turning now to FIG. 2, a GI 112 for a user is stored on the server 102 and can be accessed by the face association component 108. When a GI 112 is created by associating a user's face with the user's personal identifier, the GI 112 can be stored as part of the global identifier universe 200 along with a plurality of additional global identifiers for other users. Within the global identifier universe 200, a GI 112 can be organized into a person group 202, which is a subset of the global identifier universe 200. A person group 202 can correspond to a particular event, a group of users that have ticketed access to a particular event, a particular class of users such as users eligible for VIP access, users that have ticketed access to a particular entrance or section of a venue, among others. In one embodiment, a person group 202 includes all global identifiers for all users having a face-associated ticket 110 for a particular event. A GI 112 can exist in a single person group 202 or in multiple person groups 202. In an example, a user purchases a ticket for a first event. The user's GI 112 can then be associated with the first event's person group. The same user also purchases a ticket for a second event, and the user's GI 112 can then be associated with both the first event's person group and the second event's person group. In another example, a user purchases a ticket for a first event, and the user's GI 112 can then be associated with the first event's person group. The user also purchases a ticket allowing access to the first event's VIP access section, and the user's GI 112 can then also be associated with the first event's VIP access person group.

Figure 3:
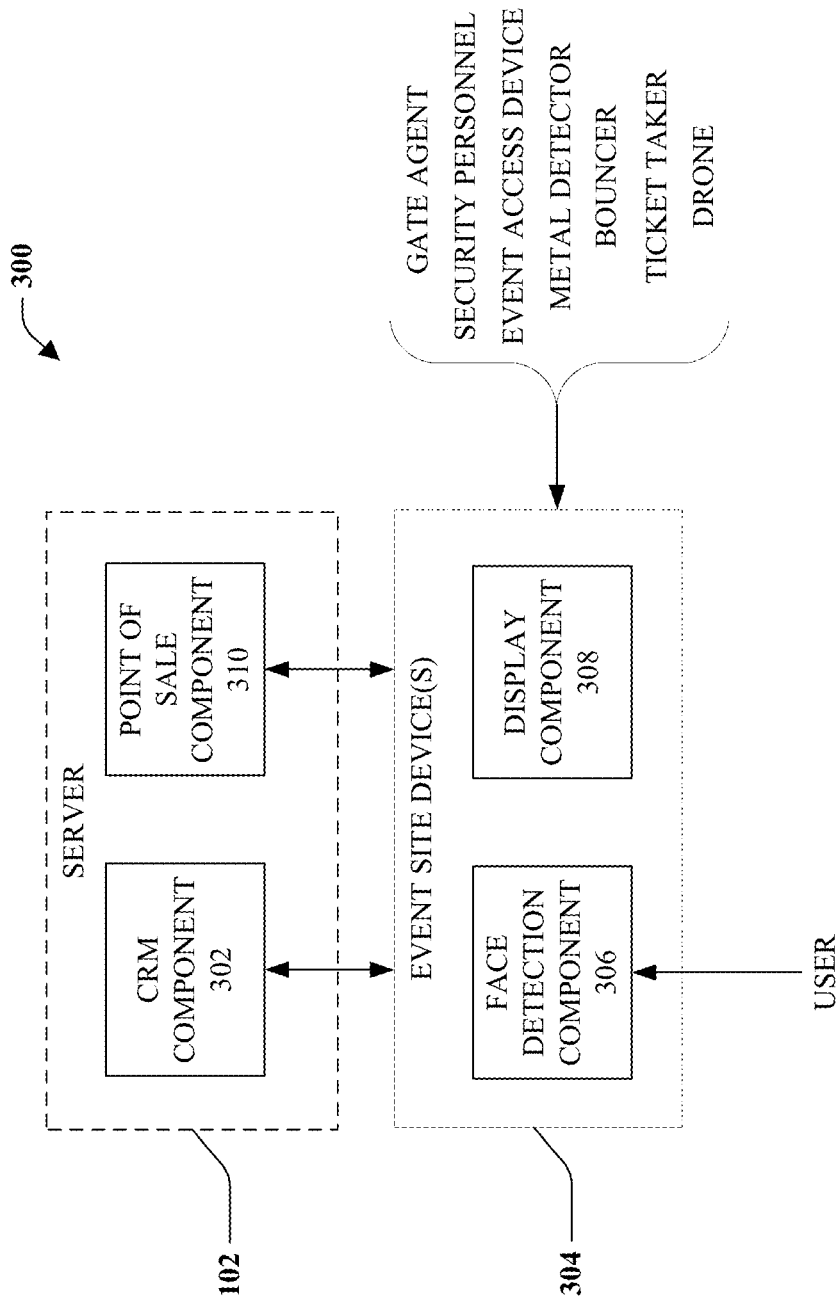
FIG. 3 is a block diagram of an event entry portion of a facial recognition ticketing system.

FIG. 3 illustrates an event entry system 300 that includes the server 102 having a customer relationship management (CRM) component 302 and a point of sale component 310, along with event site devices 304 having a face detection component 306 and a display component 308. In particular, the event site device 304 can be any device or combination of devices having a screen and being capable of taking a photo or video of a person's face. By way of example and not limitation, the event site device can be a smartphone, wearable computer (i.e. glasses, wristwatch, etc), a tablet, a computer, a user terminal, or any combination of these devices.

Face detection component 306 can receive an image of a user and recognize the face of the user using any known facial recognition technology or techniques. The facial recognition can be based on any combination of the user's eye colors, eye patterns, hairline, facial bone structure, facial feature position, among others. In certain embodiments, the face detection component 306 exists on the server 102. In other embodiments, the face detection component 306 exists locally on the event site device 304. For example, the global identifier universe 200 or one or more person groups 202 and any related ticketing information can be stored locally on the event site device 304. In some embodiments, the global identifier universe 200 or one or more person groups 202, and any related ticketing information can be stored on an external component locally coupled with the event-site device. Such local storage allows all processing to be performed locally without the need for a network connection. In still other embodiments, the face detection component 306 exists both on the server 102 and on the event site device 304.

In an embodiment, the face detection component 306 receives an image of a user's face. The face detection component 306 can communicate with the CRM component 302 on the server 102 to determine whether the user's face corresponds with any face-associated tickets 110. If it is determined that there are face-associated tickets 110 corresponding to the user, the display component 308 can display information related to the user and/or regarding the tickets associated with the user. For instance, the display component 308 can display information such as the user's personal information, the number of tickets associated with the user, VIP status of the tickets, or certain known preferences of the user (seating preferences, food preferences, drink preferences) as described later with reference to FIG. 5. In certain embodiments, the face detection component 206, upon receiving an image of a person's face, searches for a GI 112 that corresponds to the image of the person's face. Face detection component 306 can be configured to search for a corresponding GI 112 among all global identifiers in the global identifier universe 200 or it can be configured to search for a corresponding GI 112 only among one or more specified person group 202. Searching among one or more person groups 202, as compared to searching among the entire global identifier universe, reduces the amount of global identifiers to be searched, thus reducing the amount of processing and bandwidth necessary to perform the facial recognition tasks.

The face detection component 306 of the event site device 304 can employ various methods to adjust the confidence level of facial recognition according to various factors. For example, face detection component 306 can be configured to only accept faces that are larger than a predetermined face size threshold (for example, measured in total pixel size). This configuration provides more accurate face scans because it would only scan faces that are sufficiently close to the event site device 304 based on the predetermined face size threshold. This predetermined face size threshold can be adjusted based on various factors such as cost of event entry or security levels. In other embodiments, face detection component 306 can be configured to accept and identify faces that have been matched to a corresponding GI 112 with a confidence level above a predetermined confidence level threshold. For example, a strict confidence level can be set at 95%. If a user's face is not matched to a GI 112 with a confidence level of at least 95%, the face detection component does not positively identify the user. In some embodiments, the predetermined confidence level can be adjusted using artificial intelligence, depending on various factors. For example, if a user is a season ticket holder or a frequent ticket holder for a certain event, the face detection component 306 can adjust the predetermined confidence level to a lower threshold for that user, making it easier for the user to be identified by the face detection component 306, and reducing the risk of a failed identification.

Figure 4:
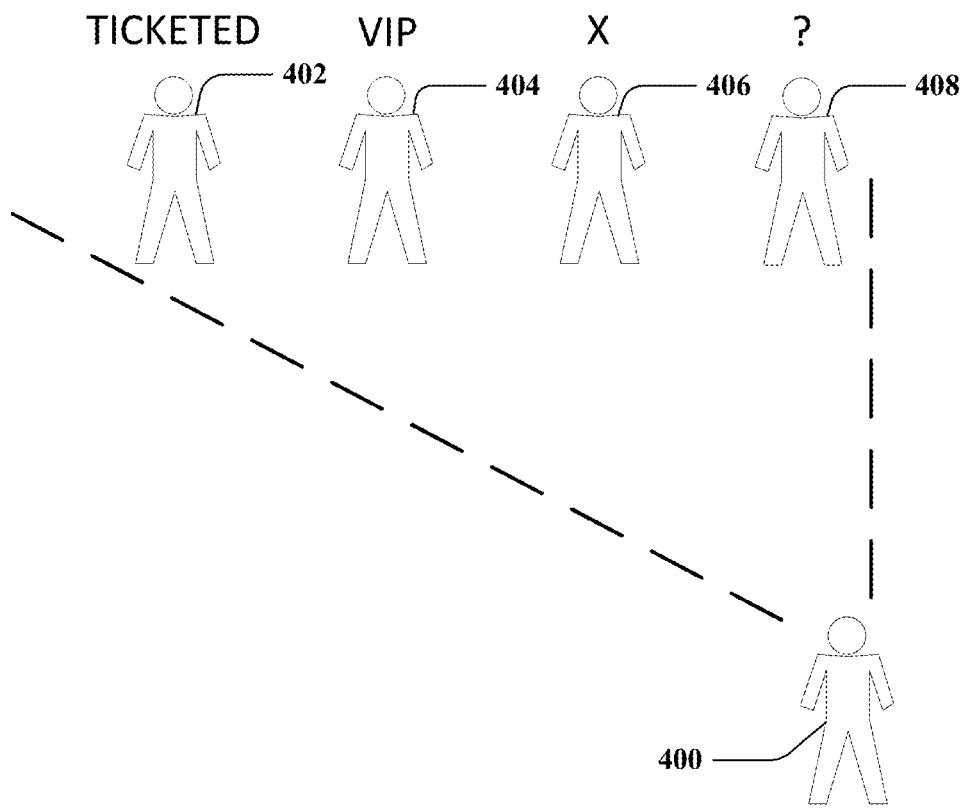
FIG. 4 is an illustration of event staff utilizing an event site device.

In an embodiment shown in FIG. 4, the event site device 304 can be an augmented reality device, such as augmented reality glasses, that is worn by event staff 400. As a person approaches the entrance to an event, the event site device 304 can scan the faces of approaching guests. The event site device 304 performs facial recognition and can display an indication to the event staff 400 specifying whether each individual guest is ticketed or not ticketed. In some embodiments, the event site device 304 can display a person's ticketing information or ticketing status as visually corresponding with the user as seen through the augmented reality device or as seen on a display screen. Event site device 304 can indicate a person's status in a variety of ways. For example, a ticketed user 402 (e.g. a user having a face-associated ticket 110 for a particular event) can have an indication such as a color indication (e.g. green icon), an icon (e.g. check mark), or text (e.g. "TICKETED") appearing in correspondence with the ticketed user 402 as seen by the event staff 400 using the event site device 304. In another example, a VIP user 404 can have an indication such as a color indication, an icon, or text (e.g. "VIP") appearing in correspondence with the VIP user 404 as seen by the event staff 400 using the event site device 304. In another example, a non-ticketed user 406 can have an indication such as a color indication (e.g. red icon), an icon (e.g. an "X"), or text (e.g. "NON-TICKETED") appearing in correspondence with the non-ticketed user 406 as seen by the event staff 400 using the event site device 304. In another example, an unidentified user 408 can have an indication such as a color indication, an icon (e.g. "?"), or text (e.g. "UNIDENTIFIED") appearing in correspondence with the unidentified user 408 as seen by the event staff 400 using the event site device 304. An unidentified user 408 is a person that the event site device 304 cannot obtain a sufficiently clear view of the person's face to allow for an accurate identification. It should be appreciated that event site device 304 can view multiple people and display the corresponding indications simultaneously as depicted in FIG. 4.

Depending on the event site device's 304 identification of a user, the event staff 400 can react accordingly. For example, when the event site device 304 identifies a ticketed user 402, the event staff 400 can allow the ticketed user to enter the event. In another example, when the event site device 304 identifies a VIP user 404, the event staff 400 can allow the VIP user 404 to enter a VIP section or provide the VIP user with identification or credentials as a VIP user. In another example, when the event site device 304 identifies a non-ticketed user 406, the event staff 400 can direct the non-ticketed user 406 to a customer service representative or a ticketing office. In another example, when the event site device 304 specifies an unidentified user 408, the event staff 400 can direct the unidentified user 408 to a customer service representative or a ticketing office. All users can be provided with a second level of security such as a secret code or password that may function as a backup in situations where a user's face cannot be identified. For example, an unidentified user 408 can present his or her code or password to a customer service representative who may look up the unidentified user's 408 GI 112 and/or face-associated ticket(s) 110. In other embodiments, the secret code or password can be used in addition to the face recognition as a two-factor identification. For example, a user can be required to provide his or her secret code or password after the user's face is identified in an entrance situation or point-of-sale interaction. It should be appreciated that in certain embodiments, a user would be able to exit an event and re-enter the event based on an additional face scan without having to mark the user or re-scan a ticket. In these embodiments, a face-associated ticket 110 can become non-transferable after the user's initial entry.

As described above, event staff 400 may view and identify guests using an event site device 304 such as an augmented reality device. In other embodiments, the event site device 304 may be a single camera or a plurality of cameras that can scan an entrance area or other crowd gathering point to identify guests as described above. In these embodiments, event staff 400 can monitor a display component 308 to identify guests as, for example, ticketed users 402, VIP users 404, non-ticketed users 406, unidentified users 408, etc. In another embodiment, a camera or a plurality of cameras can receive images of guests approaching an entrance point such as a turnstile, a door, a gate, among others. Upon detection of a ticketed user 402 (or a VIP user 404 for VIP access), the entrance point can automatically allow the ticketed user 402 to enter the event. In certain embodiments, the server 102 is configured to transmit the ticketed user's ticketing information to an event access device. The event access device can be a processor, a component of the server 102, a component of the event site device 304, or it can be a component of an event's access point such as a turnstile, door, or entry gate. In these embodiments, the event access device is configured to allow the user to enter an event venue based on verification of the ticketing information. The event access device allows the user to enter an event by, for example, unlocking or automatically opening a turnstile, door, or entry gate. In certain embodiments, such automatic entry points can be used to separate different sections of an event including VIP sections, restricted areas, seating sections, rows, etc. In these embodiments, a ticketed user 402 can gain access to his or her seat through a series of one or more face scans performed by event site devices 304 that operate the automatic entry points along the ticketed user's 402 path.

In certain embodiments, once a user is identified, personalized directions may be presented to the user on a public screen or sent to a personal device belonging to the user. In one example, the event site device 304 identifies a ticketed user 402, and the ticketed user 402 is allowed entrance to an event. Upon identifying the ticketed user 402, the facial recognition ticketing system can communicate information about the ticketed user 402 to an in-event display system. In this manner, the in-event display system can display personalized information to the ticketed user 402 on public displays, such as directions to the ticketed user's 402 seat or directions to the ticketed user's 402 favorite concessions. In an example, a display screen (e.g. an LED screen) displays directions personalized to the ticketed user 402. The personalized directions may include the ticketed user's 402 name so that the ticketed user 402 can identify that the directions are directed towards him or her.

In another example, upon identifying the ticketed user 402, the facial recognition ticketing system can communicate personalized information to the ticketed user's 402 personal device (e.g. mobile phone, smartwatch, wearable computer, etc.). The personalized information can include, for example, directions to the ticketed user's 402 seat, or directions to the ticketed user's 402 favorite concessions. In some embodiments, the ticketed user's 402 location can be obtained via a GPS transponder in the ticketed user's 402 personal device. In these embodiments, navigation can be provided to the ticketed user 402, for example, to direct the ticketed user 402 to his or her seat.

Figure 5:
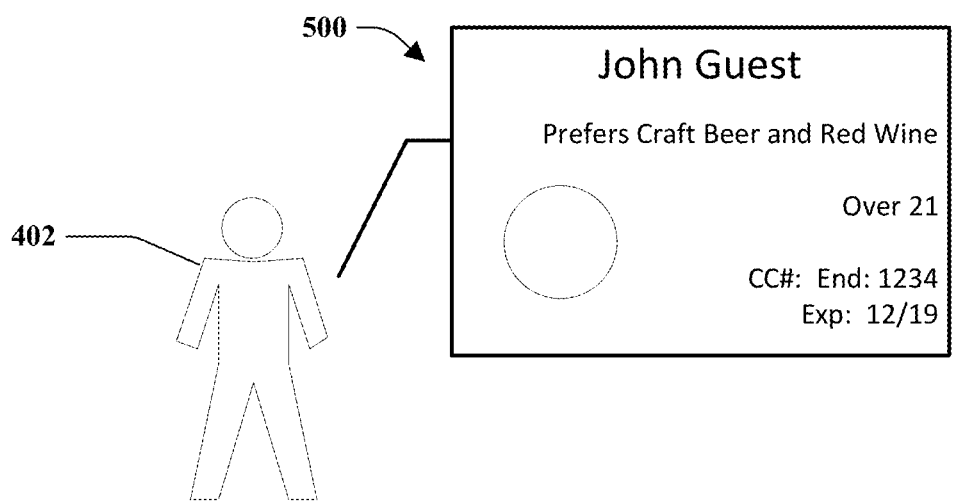
FIG. 5 is an illustration of user information displayed for a ticketed user.

CRM component 302 can store a user's associated ticket information as well as user's personal preferences such as beverage preference, food preference, seat preference, music preference, etc. As shown in FIG. 5, in certain embodiments, event site devices 304 can be used to recognize a user who has entered an event and can provide event staff with user information 500 to enhance the user's experience. User information 500 that can be provided to the event staff 402 can include the user's name, drink preference, food preference, seating preference, music preference, age classification (e.g. over/under 21), VIP status, associated payment types, picture of the user, among others. For example, an event site device 304 can display information pertaining to the user's seating preferences to an usher. In another example, an event site device 304 can display information pertaining to the user's food or drink preferences to a concessions worker or bar staff. The point of sale component 310 can also receive personalized information pertaining to the user from the CRM component 302 in order to target the user with advertisements. These targeted advertisements can be pushed to the user's personal device, or they can be strategically displayed on public displays when the user's location is detected near the public display. In certain embodiments, advertisements can be pushed to the user's personal device regardless of user information stored on the CRM component 302. For example, an advertiser can choose to have content pushed to every ticketed user's personal device. In another example, an advertiser (e.g. event sponsor, DJ, artist, performer, food/drink supplier, etc.) can push advertisements to all ticketed users who are attending an event.

Figure 6:
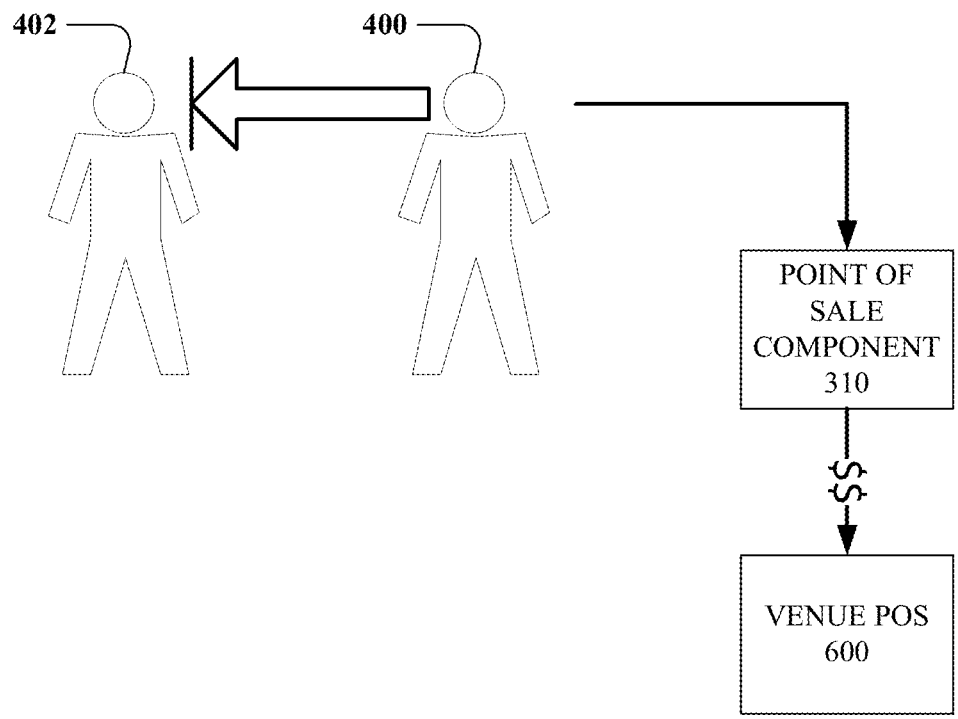
FIG. 6 is an illustration of a user making a purchase by utilizing a point of sale component.

Turning now to FIG. 6, when an event site device 304 recognizes the face of a user, the point of sale component 310 can recall the user's account information which can contain stored payment information such as credit card information. The point of sale component 310 allows a recognized user with an account to automatically make payments for concessions, food, drink, souvenirs, etc. The point of sale component 310 can securely transmit the user's payment information to the event venue's point of sale system 600. In this way, event staff 400 may sell items (food, drink, souvenirs, etc.) to a ticketed user 402 and receive payment by detecting the ticketed user's 402 face with an event site device 304.

Figure 7:
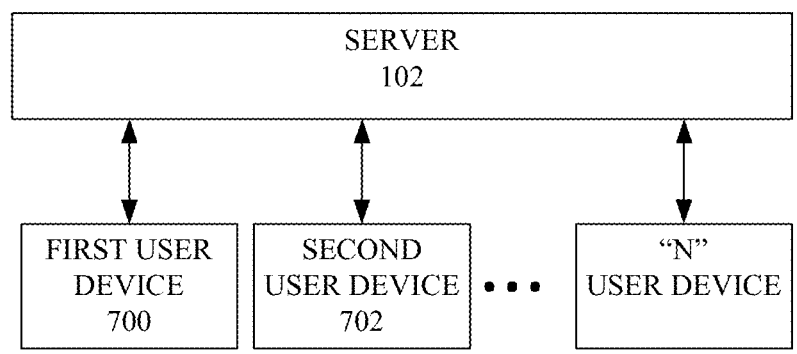
FIG. 7 is a block diagram of a user-created group communications environment.

Turning now to FIG. 7, users can interact with each other using user devices. In certain embodiments, a first user can use a first user device 700 to create a user-created group that allows the first user to monitor the location or status of a second user using a second user device 702. The first user device 700 and the second user device 702 can report information such as location (e.g. GPS location), ticketing status, event entry status, VIP status, among other information, to the server 102. If the second user provides authorization for the first user to receive the second user's information, the first user can use the first user device 700 to view the information from the second user device 702. In an example, a first user and a second user are both members of a user-created group and have both provided authorization to share their information with other group members. While inside an event, first user can use first user device 700 to check and see whether second user has arrived at the event. The user-created group also can allow for messaging among users. It should be appreciated that any number of users may use their user device to join a user-created group and share such information.

Figure 8:
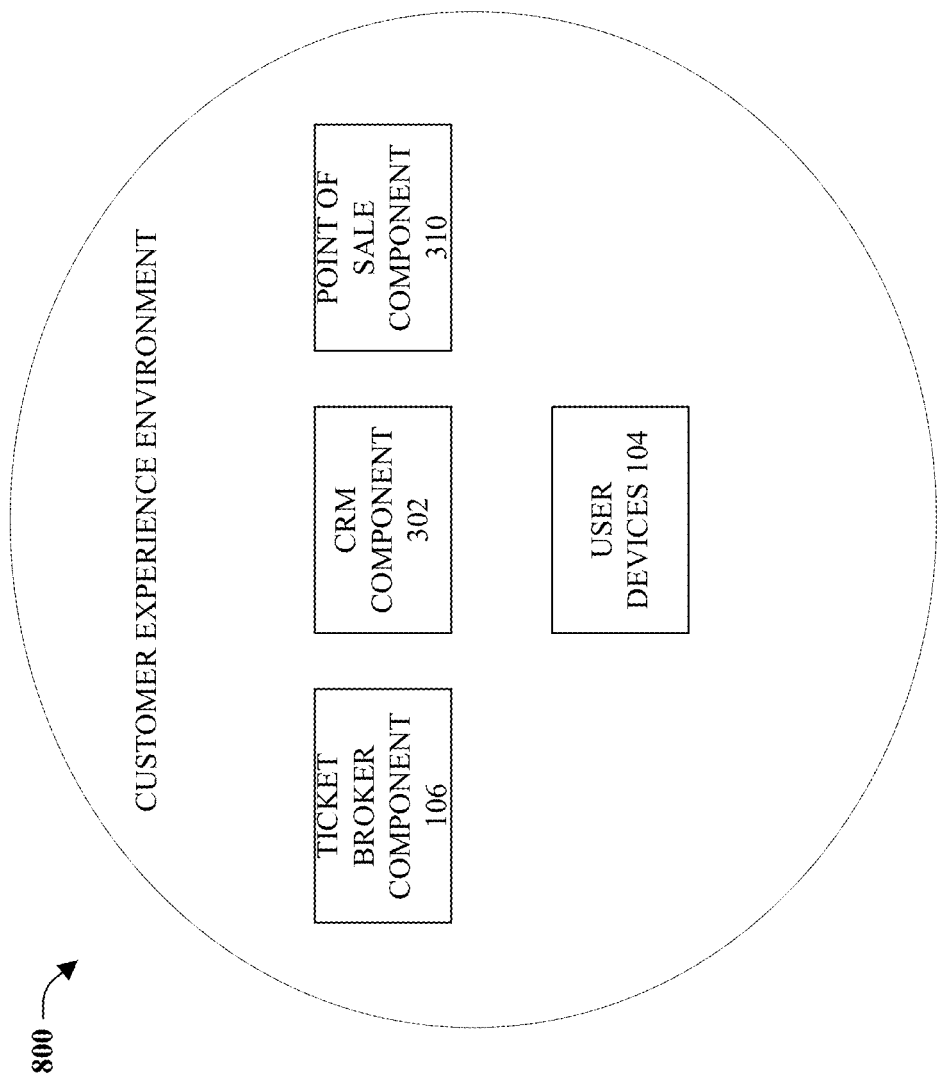
FIG. 8 is a block diagram of a customer experience environment.

FIG. 8 illustrates a customer experience environment 800 which encompasses several components and devices of the present system. The distributed nature of the customer experience environment 800 allows each component (for example, ticket broker component 106, CRM component 302, point of sale component 310, and user devices 104) to work together seamlessly to provide an enhanced customer experience.

Figure 9:
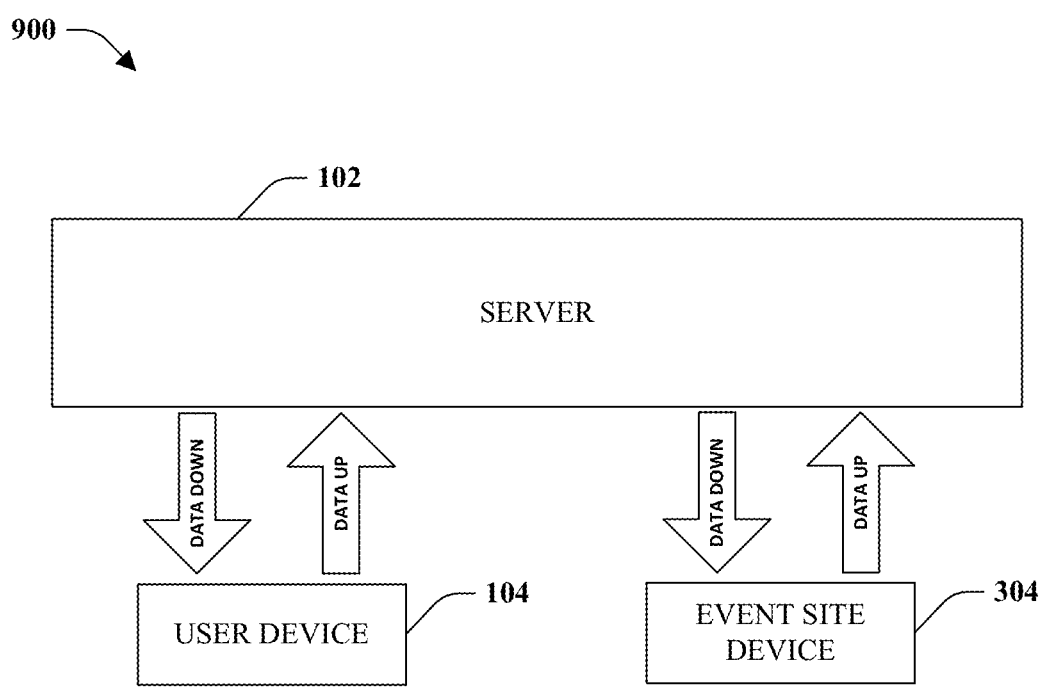
FIG. 9 is an illustration of an embodiment of data communications between a user device, an event site device and a server at one or more locations.

FIG. 9 illustrates a system 900 in which data communications involving the user device 104 and the event site device 304, with the server 102 facilitate the facial recognition ticketing system. For instance, the user device 104 and the server 102 can include a first data communications that includes data such as, but not limited to, ticket purchase information or facial image data in an upstream of data (e.g., from the user device 104 to the server 102). The event site device 304 can further communicate an upstream of data (e.g., from the event site device 304 to the server 102) to the server 102 that includes data such as, but not limited to, scanned facial image data.

The server 102 can utilize a downstream of data (e.g., from the server 102 to the user device 104). For instance, the server 102 and the user device 104 can include a downstream data communication that includes data such as, but not limited to, ticket inventory information or ticket purchasing options. The server 102 can utilize a further downstream of data from the server 102 to the event site device 304. For instance, the server 102 and the event site device 304 can include a downstream data communication that includes data such as, but not limited to, a recognized user's personal information, a user's associated ticket information, a user's preferences, a user's admission status, etc.

It is to be appreciated that "data up" is referenced in FIG. 8 and corresponds to "upstream of data" and "data down" is referenced in FIG. 8 and corresponds to "downstream of data."

Figure 10:
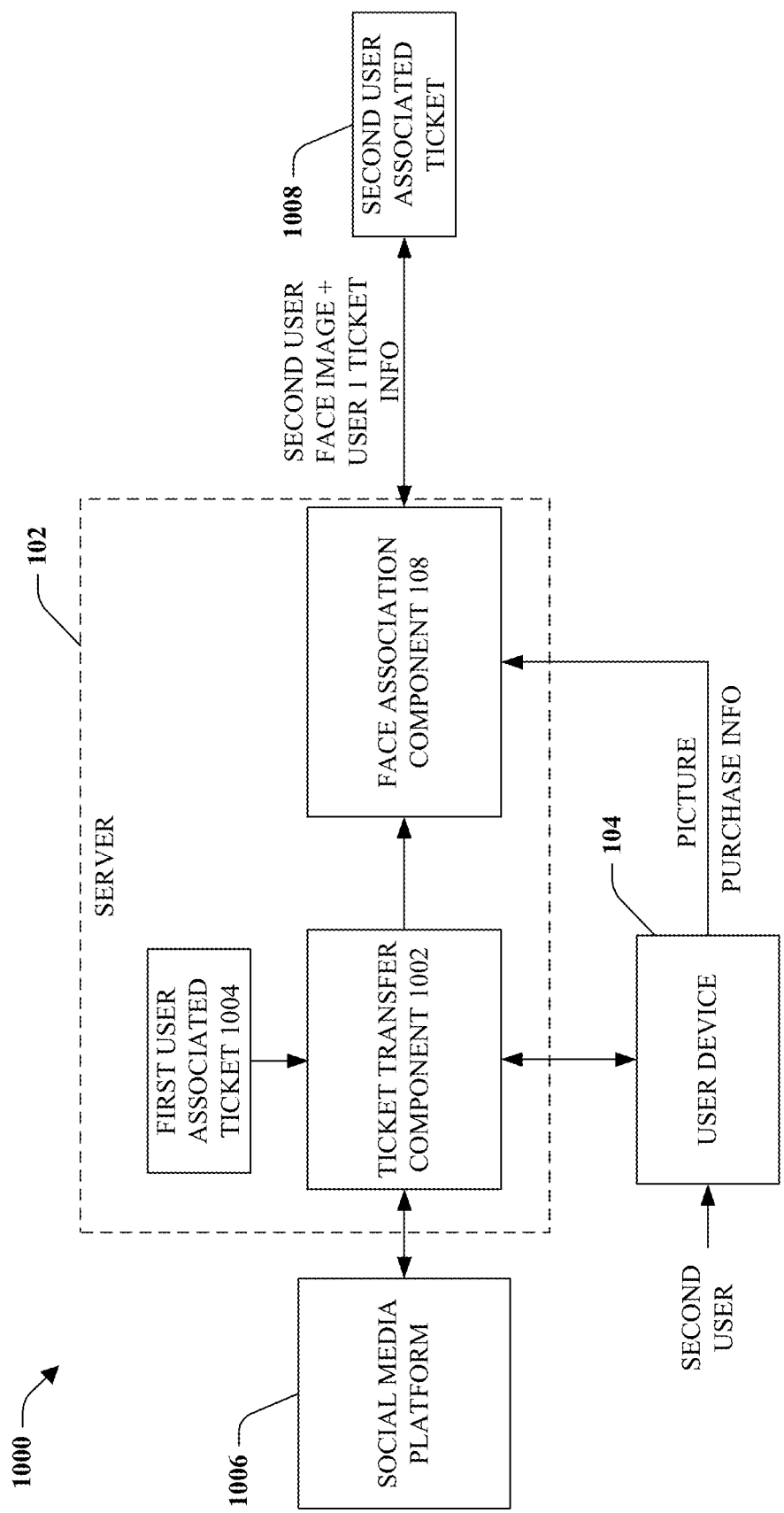
FIG. 10 is a block diagram of a ticket transfer portion of the facial recognition ticketing system.

Turning to FIG. 10, a system 1000 is illustrated utilizing a ticket transfer component 1002 included as part of the server 102. A first user can transfer a first user associated ticket 1004 to a second user. In an embodiment, the first user can specify a second user to which the ticket is transferred. The second user can be specified from a direct identification, from an online marketplace facilitated by the server 102, or from a list aggregated from a linked social media platform 1006 interface. When the second user is specified, the second user can use a user device 104 to upload an image of the second user's face to the server 102. The face association component 108 can associate the second user's face with the ticket information from the first user associated ticket 1004 to create a second user associated ticket 1008. In an embodiment, the GI 112 is updated to change the correlation of the ticketing information from the first user to the second user. Ticket transfer component 1002 can also facilitate payment transfer between the first user and the second user.

Figure 11:
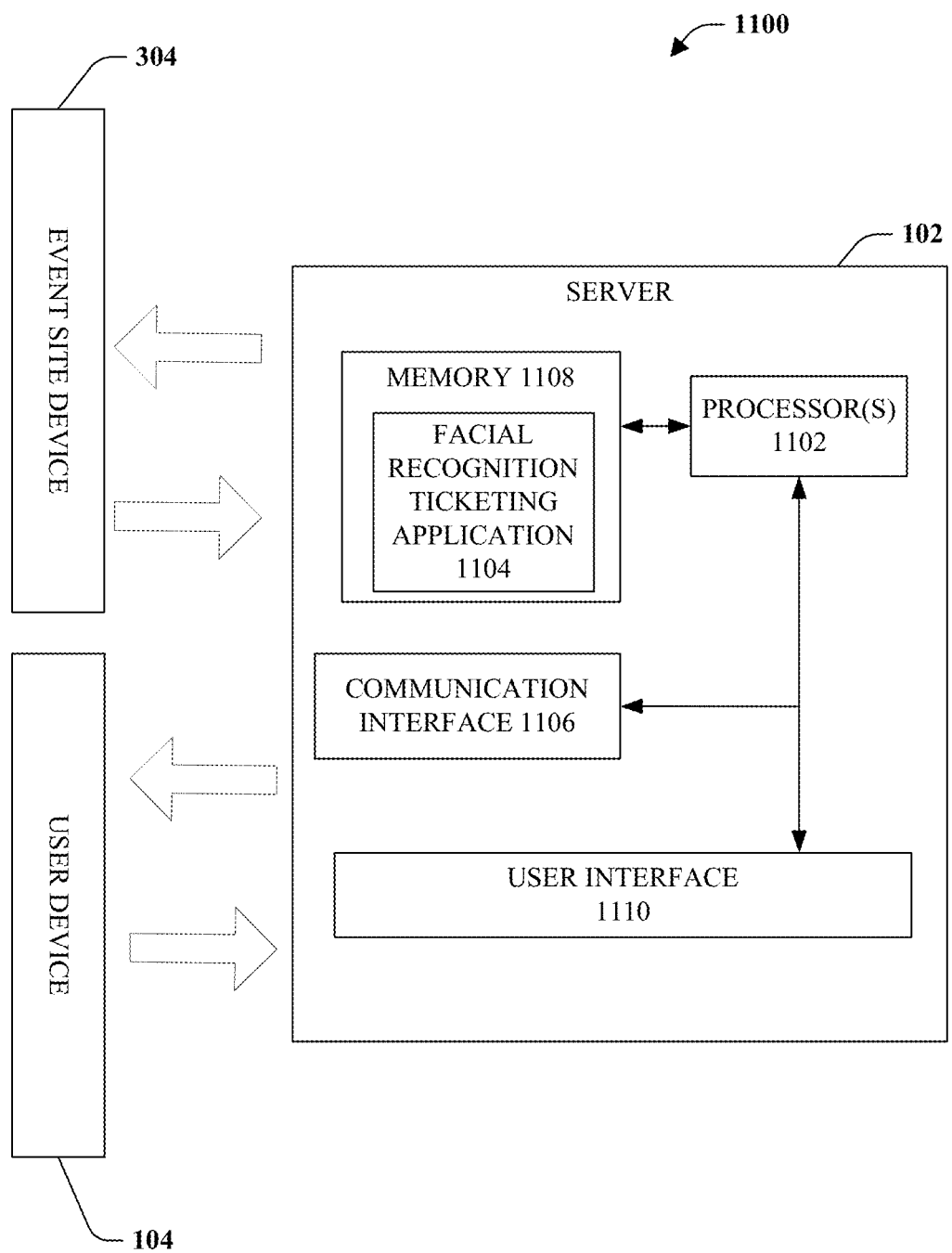
FIG. 11 is block diagram of a system that aggregates information related to ticketing based on data collected from a user device and an event site device.

Turning to FIG. 11, a system 1100 is illustrated utilizing the server 102. The server 102 includes one or more processor(s) 1102 configured to execute computer-executable instructions such as instructions composing facial recognition ticketing application 1104. Such computer-executable instructions can be stored on one or more computer-readable media including a non-transitory, computer-readable storage medium such as memory 1108 of server 102.

The server 102 includes a communication interface 1106. As shown in FIG. 10, the communication interface 1106 can enable electronic communications between the user device 104 and the event site device 304. It is to be appreciated that the communication interface 1106 can be a wired or wireless interface including, but not limited to, a LAN cable, an Ethernet cable, a USB interface, a serial interface, a WiFi interface, a short-range RF interface (Bluetooth), an infrared interface, a near-field communication (NFC) interface, etc.

The server 102 can further include a user interface 1110 that comprises various elements to obtain user input and to convey user output. For instance, user interface 1110 can comprise a touch display which operates as both an input device and an output device. In addition, user interface 1110 can also include various buttons, switches, keys, etc. by which a user can input information to server 102, and other displays, LED indicators, etc. by which other information can be output to the user.

In accordance with an embodiment, the server 102 is a computing device, which can be hosted at a physical location. However, it is to be appreciated that the server 102 can be other portable form-factors such as a laptop computer, a convertible laptop, a cell phone, a PDA, a pocket computing device, a watch computing device, or the like. Moreover, it is to be appreciated that the functionality described herein with respect to the server 102 can be performed by a desktop computer, or other larger, less portable computing device. That is, facial recognition ticketing application 1104 can be installed and executed on substantially any computing device provided that such a computing device can communicate with the server 102 as described herein.

It is to be appreciated that the server 102 can be a network or a portion of a network, wherein the network is at least one of a website, a server, a computer, a cloud-service, a processor and memory, or a computing device connected to the Internet and connected to the user device 104 and the event site device 304. In general, the network can be coupled to one or more devices via wired or wireless connectivity in which data communications are enabled between the network and at least one of a second network, a subnetwork of the network, or a combination thereof. It is to be appreciated that any suitable number of networks can be used with the subject innovation and data communication on networks can be selected by one of sound engineering judgment and/or one skilled in the art.

Figure 12:
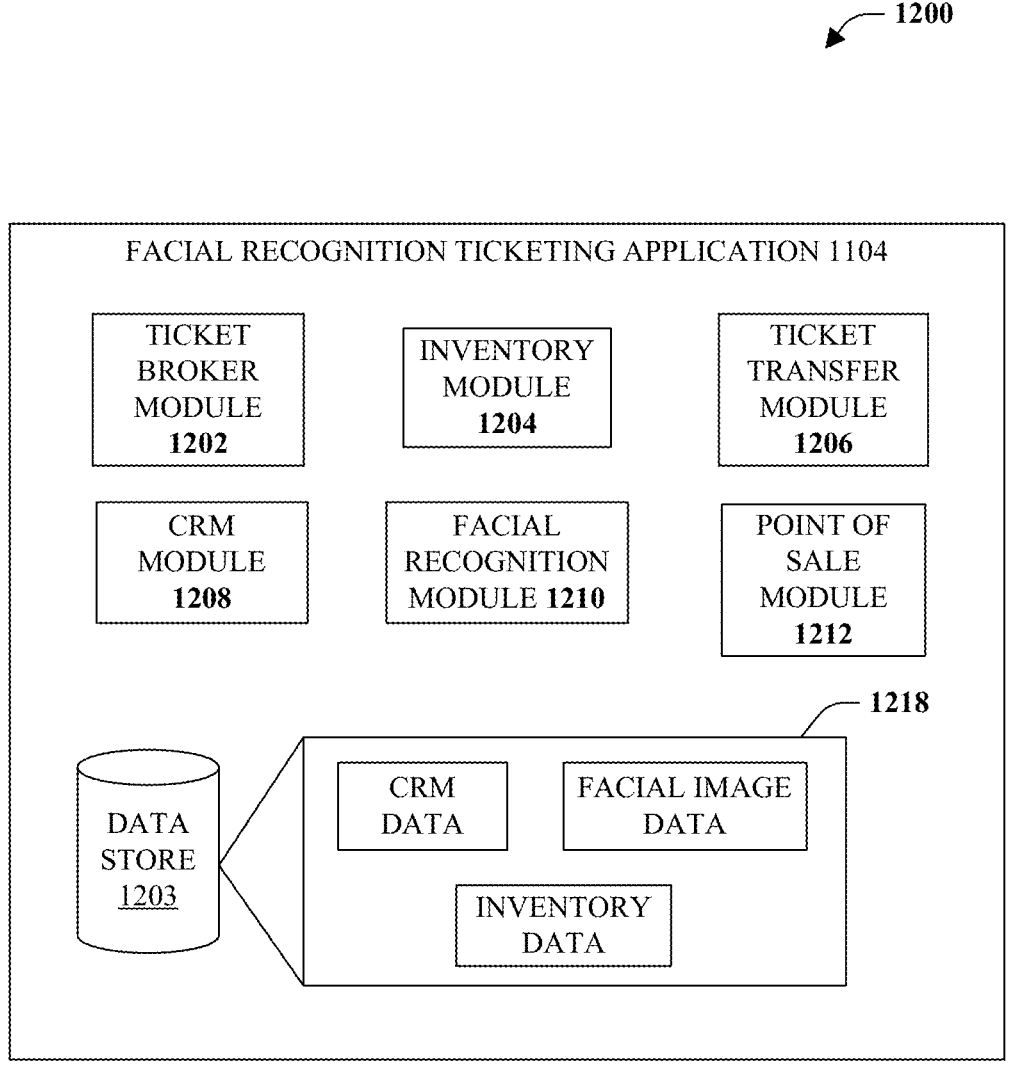
FIG. 12 is a block diagram of an exemplary, non-limiting facial recognition ticketing application according to one or more aspects.

FIG. 12 illustrates a block diagram of an exemplary, non-limiting embodiment of the facial recognition ticketing application 1104 according to one or more aspects. The facial recognition ticketing application 1104 comprises computer-executable instructions and computer-readable data stored on memory 1108 of the server 102. The computer-executable instructions of facial recognition ticketing application 1104 are executable by processor 1102 of the server 102.

As shown in FIG. 12, the facial recognition ticketing application 1104 can include one or more modules (e.g., ticket broker module 1202, inventory module 1204, ticket transfer module 1206, CRM module 1208, facial recognition module 1210, point of sale module 1212, among others) and data 1218 stored on a data store 1203 that stores data 1218 (e.g., CRM data, facial image data, inventory data, among others). The one or more modules can include computer-executable instructions implementing various features, processes, operations, etc. of the facial recognition ticketing application 1104. Ticket broker module 1202 can allow a user to search for and purchase or select tickets. Inventory module 1204 can store ticketing information related to total quantity of tickets available for an event and/or tickets remaining for an event. Ticket transfer module 1212 facilitates the ticket transfer process from a first user to a second user. CRM module 1208 can store and retrieve information related to a user and/or the user's account, including ticketing information, user preferences, and purchase history. Facial recognition module 1210 can receive an image of a person's face and determine an identity of the person. Point of sale module 1212 can facilitate a user's purchasing experience at an event by storing payment information and user preferences.

Although a single data store 1203 is illustrated, any suitable number of data stores can be used with the system 1200. The number of data stores and the organization where the data is stored there on can be selected with sound engineering judgment and/or by one skilled in the art without departing from the scope of the subject innovation.

It is to be appreciated that any component or module from the facial recognition ticketing application 1104 can be a stand-alone component/module, a sub-component, a sub-module, an integrated component with another component, an integrated module within another module, a system, a portion of a system described herein and/or a combination thereof. Thus, the functionality described for the facial recognition ticketing application 1104 can be performed by any number of the components or modules discussed.

The aforementioned systems, modules, components, (e.g., server 102, user device 104, event site device 304, facial recognition ticketing application 1104, among others), and the like have been described with respect to interaction between several components, modules, and/or elements. It should be appreciated that such devices and elements can include those elements or sub-elements specified therein, some of the specified elements or sub-elements, and/or additional elements. Further yet, one or more elements and/or sub-elements may be combined into a single component or module to provide aggregate functionality. The elements may also interact with one or more other elements not specifically described herein.

As used herein, the terms "component," "module," and "system," as well as forms thereof are intended to refer to a computer-related entity, either hardware, a combination of hardware and software, software, or software in execution. For example, a component or module may be, but is not limited to being, a process running on a processor, a processor, an object, an instance, an executable, a thread of execution, a program, and/or a computer. By way of illustration, both an application running on a computer and the computer can be a component or a module. One or more components may reside within a process and/or thread of execution and a component may be localized on one computer and/or distributed between two or more computers. One or more modules may reside within a process and/or thread of execution and a module may be localized on one computer and/or distributed between two or more computers. It is to be appreciated that one or more processors can be utilized with the subject innovation.

It is to be appreciated that an "application" can include one or more modules that perform one or more functionalities via instructions stored on a memory executed by a processor. Moreover, although a module and functionality may be described as a single module, it is to be appreciated that modules and respective functionalities can be combined into two or more modules. Additionally, one or more applications can be provided to include the one or more modules described herein. For example, the facial recognition ticketing application 1104 can be comprised of one or more applications that perform the functionalities described herein, wherein the one or more applications include one or more of the modules described herein.

It is to be appreciated that the "application" (here the facial recognition ticketing application 1104) can be hosted in a cloud, on a mobile device, on a server, on a computing device (e.g., computer, server 102, master terminal, slave terminal, and the like), and/or a combination thereof. Moreover, although a single processor and/or memory is illustrated, it is to be appreciated that one or more processors and/or one or more memory can be employed with the subject innovation.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 13:
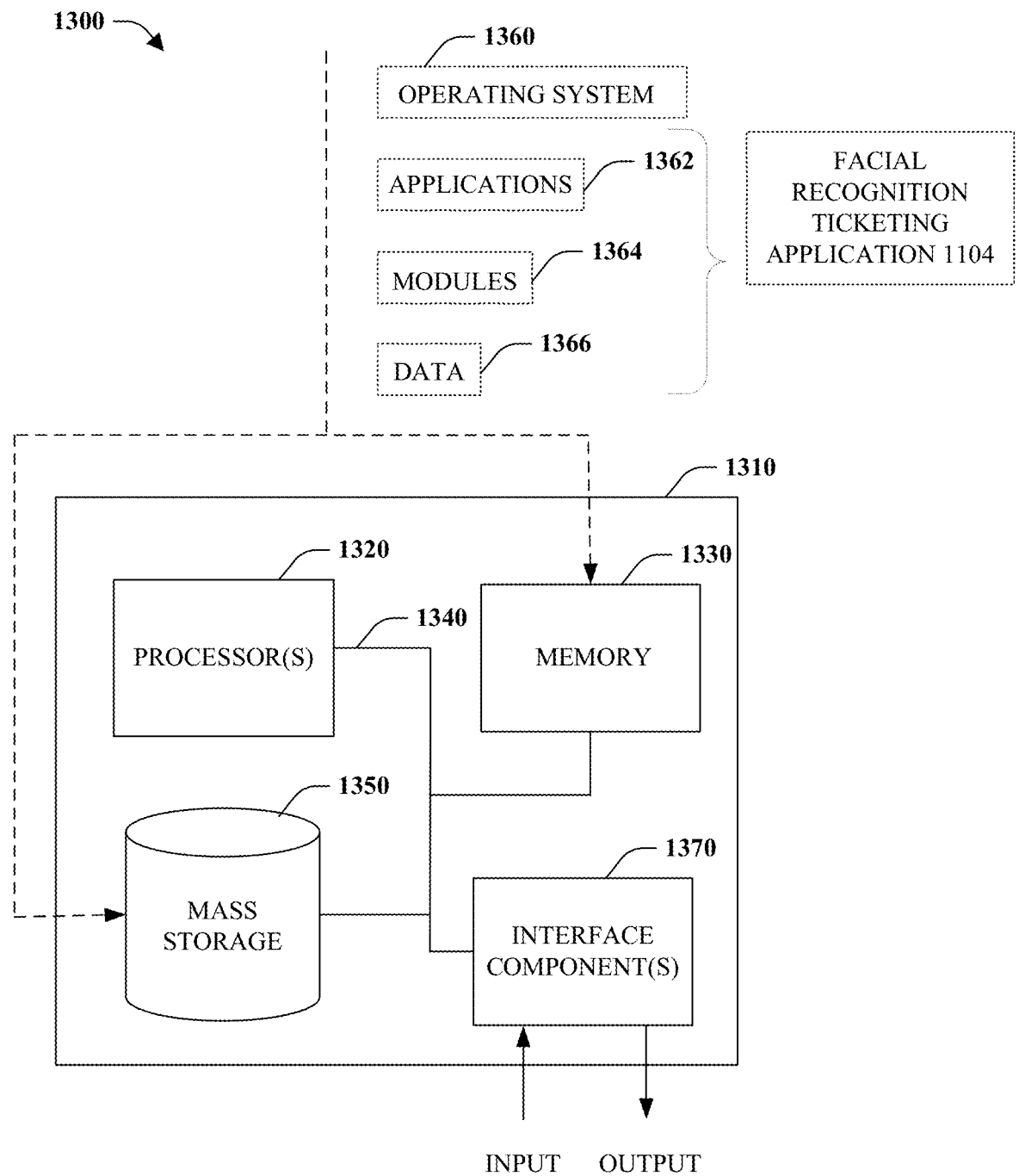
FIG. 13 is a schematic block diagram illustrating a suitable operating environment for aspects of the subject disclosure.

In order to provide a context for the claimed subject matter, FIG. 13 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), portable gaming device, smartphone, tablet, Wi-Fi device, laptop, phone, among others), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 13, illustrated is a representative system architecture 1300 including an example general-purpose computer 1310 or computing device (e.g., desktop, laptop, server, hand-held, programmable consumer or industrial electronics, set-top box, game system . . . ). The computer 1310 includes one or more processor(s) 1320, memory 1330, system bus 1340, mass storage 1350, and one or more interface components 1370. The system bus 1340 communicatively couples at least the above system components. However, it is to be appreciated that in its simplest form the computer 1310 can include one or more processors 1320 coupled to memory 1330 that execute various computer executable actions, instructions, and or components stored in memory 1330.

The processor(s) 1320 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1320 may also be implemented as a combination of computing devices, for example a combination of a DSP and a microprocessor, a plurality of microprocessors, multi-core processors, one or more microprocessors in conjunction with a DSP core, or any other such configuration.

The computer 1310 can include or otherwise interact with a variety of computer-readable media to facilitate control of the computer 1310 to implement one or more aspects of the claimed subject matter. The computer-readable media can be any available media that can be accessed by the computer 1310 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1310.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1330 and mass storage 1350 are examples of computer-readable storage media. Depending on the exact configuration and type of computing device, memory 1330 may be volatile (e.g., RAM), non-volatile (e.g., ROM, flash memory . . . ) or some combination of the two. By way of example, the basic input/output system (BIOS), including basic routines to transfer information between elements within the computer 1310, such as during start-up, can be stored in nonvolatile memory, while volatile memory can act as external cache memory to facilitate processing by the processor(s) 1320, among other things.

Mass storage 1350 includes removable/non-removable, volatile/non-volatile computer storage media for storage of large amounts of data relative to the memory 1330. For example, mass storage 1350 includes, but is not limited to, one or more devices such as a magnetic or optical disk drive, floppy disk drive, flash memory, solid-state drive, or memory stick.

Memory 1330 and mass storage 1350 can include, or have stored therein, operating system 1360, one or more applications 1362, one or more program modules 1364, and data 1366. The operating system 1360 acts to control and allocate resources of the computer 1310. Applications 1362 include one or both of system and application software and can exploit management of resources by the operating system 1360 through program modules 1364 and data 1366 stored in memory 1330 and/or mass storage 1350 to perform one or more actions. Accordingly, applications 1362 can turn a general-purpose computer 1310 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the facial recognition ticketing application 1104 (associated functionality, modules, and/or portions thereof) can be, or form part, of an application 1362, and include one or more modules 1364 and data 1366 stored in memory and/or mass storage 1350 whose functionality can be realized when executed by one or more processor(s) 1320. Moreover, it is to be appreciated that the software, firmware, or combination thereof to perform the functionality of the described components herein can be downloaded, installed, or a combination thereof from any host. For instance, the host can be an online store, a website, an IP address, an application store, a network, a storage medium, a portable hard disk, a server, or the Internet.

In accordance with one particular embodiment, the processor(s) 1320 can correspond to a system on a chip (SOC) or like architecture including, or in other words integrating, both hardware and software on a single integrated circuit substrate. Here, the processor(s) 1320 can include one or more processors as well as memory at least similar to processor(s) 1320 and memory 1330, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the facial recognition ticketing application 1104 (associated functionality, modules, and/or portions thereof) can be embedded within hardware in a SOC architecture.

The computer 1310 also includes one or more interface components 1370 that are communicatively coupled to the system bus 1340 and facilitate interaction with the computer 1310. By way of example, the interface component 1370 can be a port (e.g. serial, parallel, PCMCIA, USB, FireWire . . . ) or an interface card (e.g., sound, video . . . ) or the like. In one example implementation, the interface component 1370 can be embodied as a user input/output interface to enable a user to enter commands and information into the computer 1310 through one or more input devices (e.g., pointing device such as a mouse, trackball, stylus, touch pad, keyboard, microphone, joystick, game pad, satellite dish, scanner, camera, other computer . . . ). In another example implementation, the interface component 1370 can be embodied as an output peripheral interface to supply output to displays (e.g., CRT, LCD, plasma . . . ), speakers, printers, and/or other computers, among other things. Still further yet, the interface component 1370 can be embodied as a network interface to enable communication with other computing devices (not shown), such as over a wired or wireless communications link.

Figure 14:
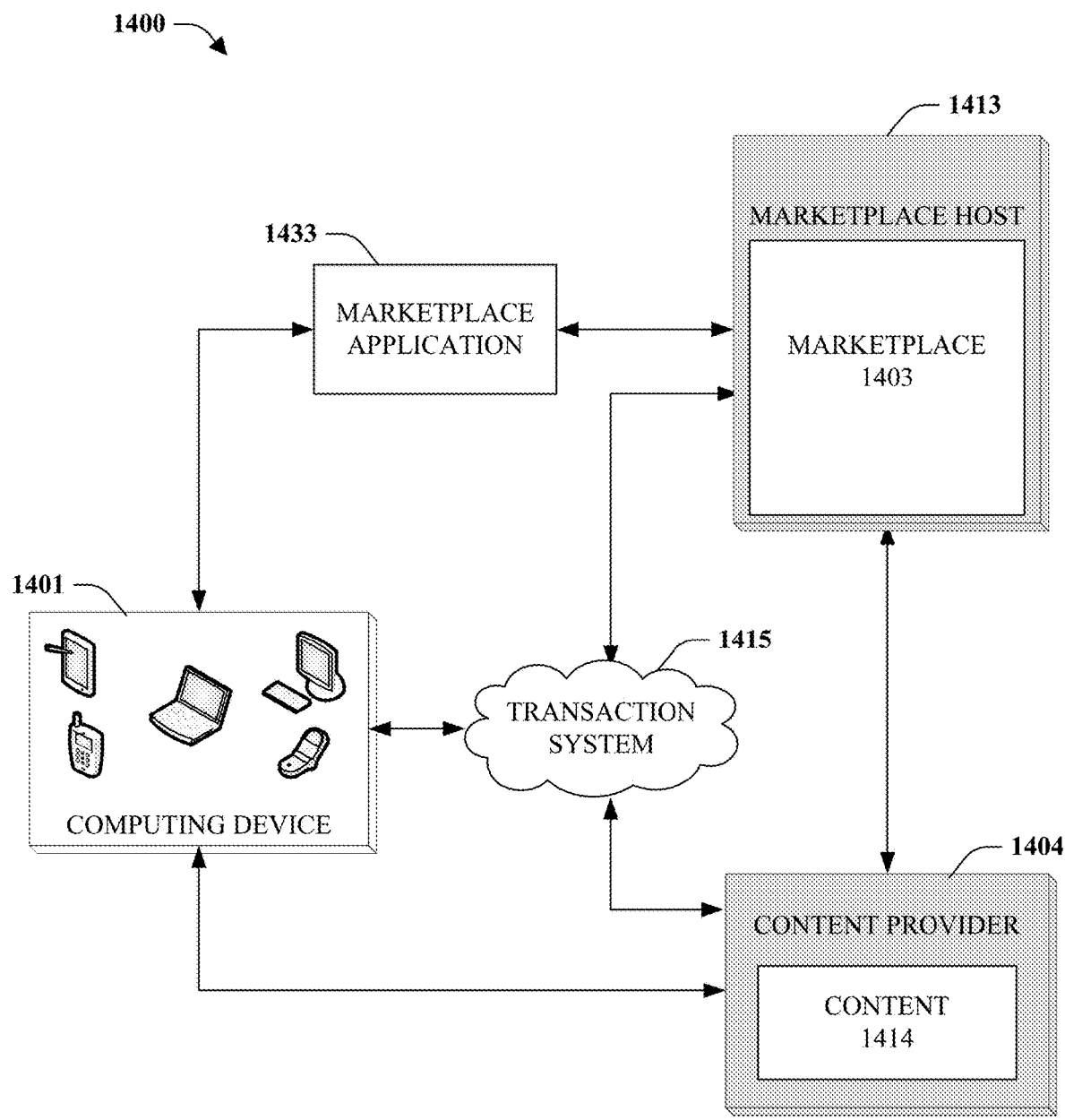
FIG. 14 is a schematic block diagram illustrating a suitable environment for delivery of data in accordance with the subject disclosure.

FIG. 14 illustrates an operating environment 1400 that can be used with the subject innovation and in particular, the facial recognition ticketing application 1104. The operating environment 1400 includes a computing device 1401 (e.g., device smartphone, a tablet, a laptop, a desktop machine, a portable gaming device, a device with Internet connectivity, among others), a user, a marketplace 1403, a content provider 1404, and content 914. The operating environment 1400 is configured to deliver data (e.g., content 914) to the computing device 1401 based upon a request from the computing device 1401 (e.g., typically initiated by a user of the computing device 1401). However, it may be appreciated that the delivery of data to the computing device 1401 can be pushed to the computing device 1401 and further approved (e.g. acceptance of license agreement, among others) by the user. The data delivered can be from a content provider 1404, wherein the data can be delivered directly to the computing device 1401 or indirectly delivered to the computing device 1401 via the marketplace 1403 and/or the marketplace applications 1433. In an embodiment, the computing device 1401 can utilize a transaction system 1415 that facilitates purchasing data via at least one of the marketplace 1403, the marketplace applications 1433, the content provider 1404, and the like. The transaction system 1415 can be configured to utilize a charging gateway to facilitate completing a transaction between entities (e.g., user, content provider, marketplace, among others).

The computing device 1401 and the marketplace 1403 can be configured to communicate across a network, for example, wherein the marketplace 1403 is accessed via the marketplace application 1433 or a user interface (UI) associated with one of the marketplace 1403 or the marketplace host 1413. The marketplace 1403 can be hosted by a marketplace host 1413 associated with any suitable host, server, computer, data store, and the like.

In one embodiment, the computing device 1401 is mobile so that it may function for a period of time without requiring a physical connection to a power source or network provider. For example, a cellular network or a Wi-Fi connection can be used by the computing device 1401 in order to transmit and/or receive data within the operating environment 1400.

A user can employ the computing device 1401 for the device's intended functions as well as communicating data with the marketplace 1403 and/or marketplace host 1413. Commonly, the user purchases content 1414 and/or products from the content provider 1404 via the transaction system 1415. It is to be appreciated that the marketplace 1403 can be in an electronic form such as a website, the marketplace application 1433, or an executable program. In a preferred embodiment, the marketplace 1403 takes the form of the marketplace application 1433 configured to run on the user's computing device 1401. The marketplace application 1433 may be utilized to install the content 1414 from the content provider 1404 onto the computing device 1401.

The marketplace 1403 can further connect the content provider 1404 and/or the content 1414 of the content provider 1404 with the computing device 1401 to allow the user to receive content 1414 via a download (e.g., communication of data packets). The marketplace 1403 can offer the user a variety of content 1414 for purchase (via the transaction system 1415) or for free of charge. The content 1414 offered by the marketplace 1403 may also come from the marketplace host 1413. For example, the content provider 1404 can have a website for direct delivery of content 1414 or have content 1414 hosted in the marketplace 1403 by the marketplace host 1413. Thus, in such an example, a user can directly receive data or content from the website of the content provider 1404 or use the marketplace application 1433 to identify the content 1414 for receipt through the marketplace 1403. Moreover, the content 1414 can be tailored to the computing device 1401. For instance, a first content can be built for a first computing device having a first operating system and a second content can be built for a second computing device having a second operating system, wherein the first content and the second content can be from the content provider 1404.

In some embodiments, the system 1400 utilizes the transaction system 1415. The transaction system 1415 can include a transaction gateway that facilitates transactions between at least the marketplace host 1413, one or more users, the marketplace 1403, and/or the content provider 1404. When the user purchases content 1414 from the marketplace 1403 or content provider 1404, a charging gateway can receive a request to apply a charge to a user account (e.g., a monetary value via an electronic transaction via an account) owned or authorized by the user. For example, the user account can be, but is not limited to being, a credit card account, an account with the content provider 1404 or marketplace host 1413, a bank account, a debit account, an e-commerce account (e.g. Pay-Pal®), an electronic account, a savings account, and the like.

The transaction gateway can store transaction data (e.g., user account, username, password, data related to the user, data related to the computing device 1401, among others) specific to a transaction to receive content 1414. The transaction gateway can further collect and/or store data regarding one or more users, wherein the data can be, but is not limited to, credit card numbers, to make it easier for the one or more users to engage in multiple transactions (e.g., simultaneously and/or various points in time). The transaction gateway can further reverse a transaction between one or more parties involved, such as providing a refund to the user.

It is to be appreciated that a purchase may not require the transfer of finances. For example, the content 1414 on the marketplace 1403 could be free to download. Additionally, a portion of the transaction system 1415 can be integrated into at least one of the content provider 1404, the marketplace host 1413, the marketplace application 1433, or a combination thereof. In another embodiment, the first content 1414 can be free but additional content related to the first content 1414 can require a purchase.

The content provider 1404 can create content 1414 (e.g., also referred to as products, software, apps, applications, and the like) that can be sold on the marketplace 1403. By way of example and not limitation, the content provider 1404 can be a videogame company that creates a game to be made available for download from the marketplace 1403. By way of another example and not limitation, a bank can develop a mobile banking application that is communicated to the marketplace 1403 and made available for download via the marketplace 1403. In such example, the bank is the content provider 1404. Additionally, the bank may host the mobile banking application on the bank's website for download or delivery to users. It is to be appreciated and understood that the content provider 1404 is not limited to these examples and the content provider 1404 can be any suitable entity (e.g., user, company, business, group of users, and the like) that creates or develops content 1414 to be distributed to the marketplace host 1413 for download via the marketplace 1403.

In particular, the content provider 1404 can allow a portion of the facial recognition ticketing application 1104 be made available for download.

The marketplace host 1413 maintains the marketplace 1403 on a network. The marketplace host 1413 owns and/or controls a host server that contains the marketplace 1403, and provides the user access to the marketplace 1403. The marketplace host 1413 can further control an amount of bandwidth allocated to the user to download the content 1414 of the one or more content providers 1404. In a non-limiting embodiment, the marketplace host 1413 can own and/or control the marketplace 1403. In another non-limiting embodiment, the marketplace host 1413 can host the marketplace 1403 on a network to enable access by the user.

In an exemplary embodiment, a user accesses the marketplace 1403 via the marketplace application 1433 located on the computing device 1401. The computing device 1401 can have access to the network, and the computing device 1401 can communicate data in the form of a query to the marketplace host 1413, wherein the data can be a request for information on content 1414. The marketplace host 1413 can communicate data in the form of a query result (which can include content 1414) via a network to the computing device 1401 for review, install, use, storage, and the like. In a non-limiting embodiment, the computing device 1401 can include a user-interface that displays the data (e.g., the query, the query result, the content 1414, among others) for the user.

Prior to download of content 1414, the user can further navigate information regarding the content 1414 that is displayed and select to either request additional content 1414 or to purchase the content 1414. If the user selects to purchase content 1414, the marketplace application 1433 communicates a purchase request to the marketplace host 1413. The marketplace host 1413 can then use the transaction system 1415 which includes the transaction gateway charging the user account if data related to the user account is available, and if the user account is not available, then the marketplace host 1413 can request user account information from the user which can then be sent to the transaction gateway. Upon receipt of the user account information, the transaction gateway can charge the user account, and send a confirmation of the transaction back to the marketplace host 1413.

The marketplace host 1413 can then communicate the confirmation information to the computing device 1401, as well as enable the user to download data for the content 1414 and/or the marketplace application 1433 stored in a host server regarding the specific content 1414 and/or marketplace application 1433 purchased. The marketplace application 1433 can further assist with installation of the content 914 or marketplace application 1433 purchased onto the computing device 1401. It is to be appreciated and understood that the above process can occur in any order, such as a downloading of application information from the marketplace host 1413 prior to the transaction and the order of the above described process is not to be limiting on the subject innovation.

One of ordinary skill in the art can appreciate that the various embodiments of the facial recognition ticketing application 1104 described herein can be implemented in connection with any computing device, client device, or server device, which can be deployed as part of a computer network or in a distributed computing environment such as the cloud. The various embodiments described herein can be implemented in substantially any computer system or computing environment having any number of memory or storage units, any number of processing units, and any number of applications and processes occurring across any number of storage units and processing units. This includes, but is not limited to, cloud environments with physical computing devices (e.g., servers) aggregating computing resources (i.e., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices can access the computing services or functionality via application program interfaces (APIs), web browsers, or other standalone or networked applications. Accordingly, aspects of the facial recognition ticketing application 1104 can be implemented based on such a cloud environment. For example, the facial recognition ticketing application 1104 can reside in the cloud environment such that the computer-executable instruction implementing the functionality thereof are executed with the aggregated computing resources provided by the plurality of physical computing devices. The cloud environment provides one or more methods of access to the subject innovation, which are utilized by the facial recognition ticketing application 1104. In an embodiment, software and/or a component can be installed on a mobile device to allow data communication between the mobile device and the cloud environment. These methods of access include IP addresses, domain names, URLs, etc. Since the aggregated computing resources can be provided by physical computing device remotely located from one another, the cloud environment can include additional devices such as a routers, load balancers, switches, etc., that appropriately coordinate network data.

Figure 15:
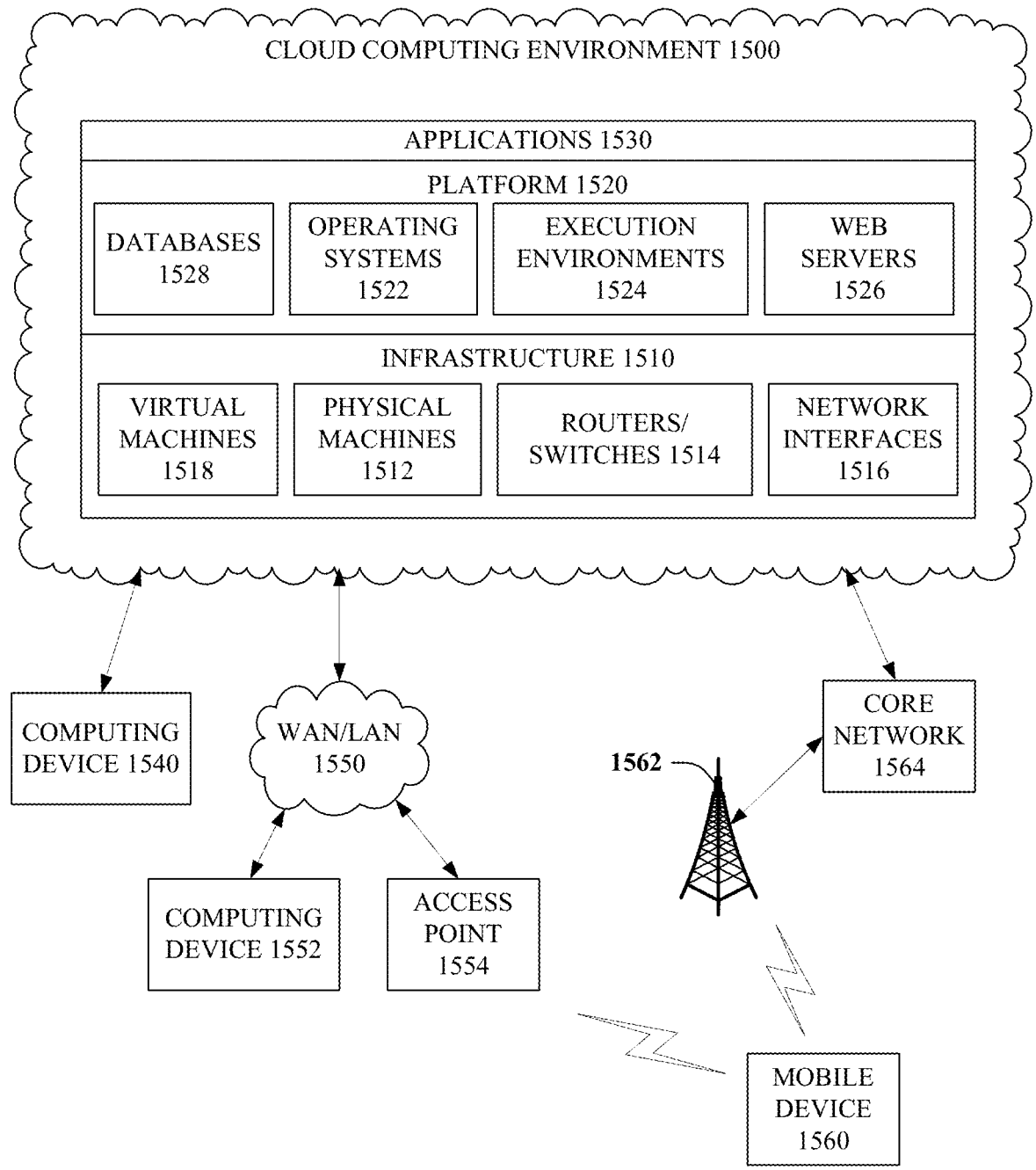
FIG. 15 is a schematic block diagram illustrating illustrates a cloud computing environment in accordance with the subject innovation.

FIG. 15 provides a schematic diagram of an exemplary networked or distributed computing environment, such as a cloud computing environment 1500. The cloud computing environment 1500 represents a collection of computing resources available, typically via the Internet, to one or more client devices. The cloud computing environment 1500 comprises various levels of abstraction: infrastructure 1510, a platform 1020, and applications 1530. Each level, from infrastructure 1510 to applications 1530 is generally implemented on top of lower levels, with infrastructure 1510 representing the lowest level.

Infrastructure 1510 generally encompasses the physical resources and components on which cloud services are deployed. For instance, infrastructure 1510 can include virtual machines 1518, physical machines 1512, routers/switches 1514, and network interfaces 1516. The network interfaces 1516 provide access to the cloud computing environment 1500, via the Internet or other network, from client devices such as computing devices 1540, 1552, 1560, etc. That is, network interfaces 1516 provide an outermost boundary of cloud computing environment 1500 and can couple the cloud computing environment 1500 to other networks, the Internet, and client computing devices. Routers/switches 1514 couple the network interfaces 1516 to physical machines 1512, which are computing devices comprising computer processors, memory, mass storage devices, etc. Hardware of physical machines 1512 can be virtualized to provide virtual machines 1518. In an aspect, virtual machines 1518 can be executed on one or more physical machines 1512. That is, one physical machine 1512 can include a plurality of virtual machines 1518.

Implemented on infrastructure 1510, platform 1020 includes software that forming a foundation for applications 1530. The software forming platform 1020 includes operating systems 1522, programming or execution environments 1524, web servers 1526, and databases 1528. The software of platform 1020 can be installed on virtual machines 1518 and/or physical machines 1512.

Applications 1530 include user-facing software applications, implemented on platform 1020, that provide services to various client devices. In this regard, at least the facial recognition ticketing application 1104 as described herein is an example application 1530. As illustrated in FIG. 10, client devices can include computing devices 1540, 1552 and mobile device 1560. Computing devices 1540, 1552 can be directly coupled to the Internet, and therefore the cloud computing environment 1500, or indirectly coupled to the Internet via a WAN/LAN 1550. The WAN/LAN 1550 can include an access point 1554 that enables wireless communications (e.g., WiFi) with mobile device 1560. In this regard, via access point 1554 and WAN/LAN 1550, mobile device 1560 can communicate wirelessly with the cloud computing environment 1500. Mobile device 1560 can also wirelessly communicate according to cellular technology such as, but not limited to, GSM, LTE, WiMAX, HSPA, etc. Accordingly, mobile device 1560 can wireless communicate with a base station 1562, which is coupled to a core network 1564 of a wireless communication provider. The core network 1564 includes a gateway to the Internet and, via the Internet, provides a communication path to the cloud computing environment 1500.

In an aspect, incorporated is an APPENDIX A (attached). APPENDIX A is a document that describes aspects of the claimed subject matter, and this Appendix forms part of this specification.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system, comprising:
an event site device comprising an imaging device, the event site device is configured to capture an image of a user for identification; and
a server configured to:
store a global identifier corresponding to the user, the global identifier comprises facial image information and a personal identifier of the user,
wherein the facial image information is associated with the personal identifier;
associate ticketing information with the user's global identifier;
receive the image of the user from the event site device;
identify the user's global identifier based on a correlation of the image of the user with the user's facial image information;
retrieve the ticketing information associated with the global identifier; and
transmit the ticketing information to at least one of the event site device or an event access device.

2. The system of claim 1, wherein the personal identifier of the user is at least one of an e-mail address or a phone number.

3. The system of claim 1, wherein the server is configured to: store a plurality of global identifiers belonging to a plurality of users, and store the user's global identifier as part of a person group, wherein the person group contains a subset of the plurality of global identifiers.

4. The system of claim 3, wherein the server is configured to identify the user's global identifier from the subset of the plurality of global identifiers contained in the person group.

5. The system of claim 3, wherein the subset of the plurality of global identifiers contained in the person group corresponds to users who purchased a ticket for an event.

6. The system of claim 1, wherein the event site device comprises a display component.

7. The system of claim 6, wherein the display component is configured to display the ticketing information.

8. The system of claim 7, wherein the display component is further configured to display the ticketing information as visually corresponding with the user.

9. The system of claim 6, wherein the event site device is an augmented reality device.

10. The system of claim 1, wherein the server comprises a point of sale component configured to transmit payment information corresponding to the user to an event venue's point of sale system based on identifying the user using the event site device or a second event site device.

11. The system of claim 1, wherein the server is configured to transmit the ticketing information to the event access device, and the event access device is configured to allow the user to enter an event venue based on verification of the ticketing information.

12. A method comprising:
receiving a user's facial image information and a personal identifier of the user from a user device;
creating a global identifier by associating the user's facial image information with the personal identifier;
associating ticketing information with the global identifier;

receiving an image of the user from an event site device;

identifying the global identifier based on a correlation of the image of the user with the user's facial image information;

retrieving the ticket information associated with the global identifier; and transmitting the ticketing information to at least one of the event site device or an event access device.

13. The method of claim 12, wherein the personal identifier of the user is at least one of an e-mail address or a phone number.

14. The method of claim 12, further comprising: storing a plurality of global identifiers belonging to a plurality of users; and storing the user's global identifier as part of a person group, wherein the person group contains a subset of the plurality of global identifiers.

15. The method of claim 14, wherein the user's global identifier is identified from the subset of the plurality of global identifiers contained in the person group.

16. The method of claim 14, wherein the subset of the plurality of global identifiers contained in the person group corresponds to users who purchased a ticket for an event.

17. The method of claim 12, further comprising: transmitting user information to the event site device, wherein the user information comprises at least one of a food preference, a drink preference, a name, an age, a VIP status, the user's payment information, or a seating preference.

18. The method of claim 17, further comprising: detecting the user's face with the event site device or a second event site device, wherein the user is making an in-event purchase; and transmitting the user's payment information to an event venue's point of sale system based on detecting the user's face while the user is making an in-event purchase.

19. The method of claim 12, wherein the ticketing information is transmitted to the event access device, and the event access device allows the user to enter an event venue based on verification of the ticketing information.

20. A system, comprising:

an event site device having a display and an imaging device, the event site device is configured to capture an image of a user for identification;

a server configured to:

associate ticketing information with an identity of the user;

receive the image of the user from the event site device;

determine the identity of the user based on facial feature information stored for the user;

retrieve the ticketing information associated with the user; and transmit the ticketing information to the event site device.

* * * * *